Figure 1:
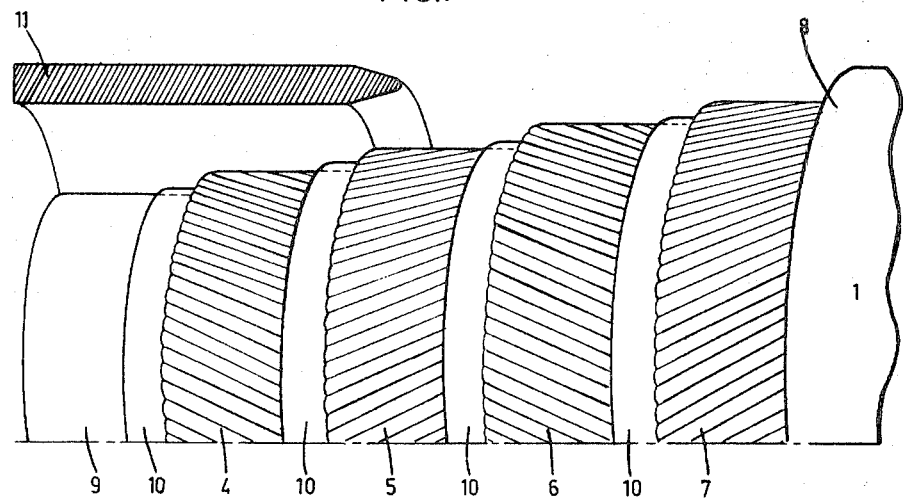

United States Patent [19]
Chevalier et al.

[11] 3,799,587
[45] Mar. 26, 1974

[54] COUPLINGS OF REDUCED SIZE AND CAPABLE OF TRANSMITTING HIGH MECHANICAL STRESSES BETWEEN AN ARMOURED FLEXIBLE MEMBER AND A RIGID ELEMENT

[75] Inventors: Andre Chevalier, Pantin; Pierre Grolet, Viroflay; Remi Reynard, Montesson, all of France

[73] Assignee: Institut Francais du Petrole, des Carburants et Lubrifiants, Rueil Malmaison, France

[22] Filed: Sept. 16, 1971

[21] Appl. No.: 181,186

Related U.S. Application Data
[62] Division of Ser. No. 25,118, April 2, 1970, Pat. No. 3,667,112.

[30] Foreign Application Priority Data
Apr. 3, 1969  France ......................... 69.10365

[52] U.S. Cl. ............... 285/137 R, 285/149, 29/508, 29/516
[51] Int. Cl. ............................................. F16l 39/00
[58] Field of Search ............... 285/256, 149, 137 R; 29/508, 516

[56] References Cited
UNITED STATES PATENTS
| | | | |
|---|---|---|---|
| 3,004,779 | 10/1961 | Cullen et al. | 285/149 |
| 3,112,937 | 12/1963 | Williams | 285/114 |
| 2,440,668 | 4/1948 | Torbox | 285/137 R |
| 3,217,282 | 11/1965 | Chevalier et al. | 285/149 X |
| 3,529,853 | 9/1970 | Triest et al. | 285/149 |

FOREIGN PATENTS OR APPLICATIONS
667,181   2/1952   Great Britain ..................... 285/256

*Primary Examiner*—Dave W. Arola
*Attorney, Agent, or Firm*—Craig and Antonelli

[57] ABSTRACT

A device for making a rigid connecting element, made of a hard material and having a jagged external wall, integral with one end of a flexible member having at least one armouring formed of the metallic wires, the device including at least one anchoring ring surrounding the connecting element and on which lays the armouring, the anchoring ring being made of a material of lower hardness than that of the materials of which the armouring and the connecting element are formed, and a wire-drawn compression ring compressing the assembly of the armouring and the anchoring ring against the connecting element.

2 Claims, 17 Drawing Figures

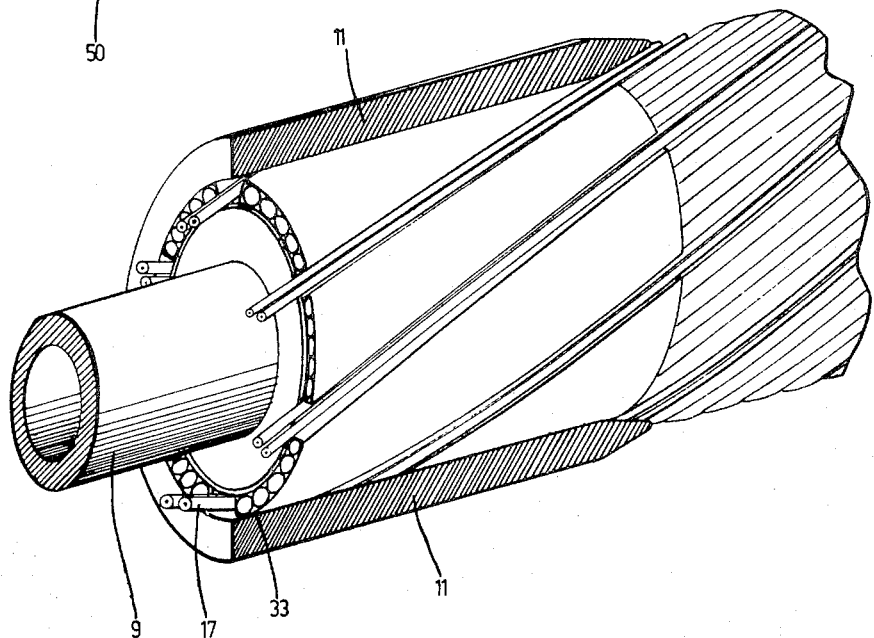
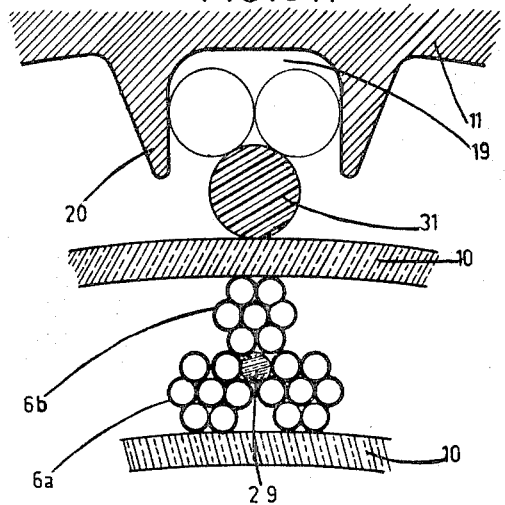

COUPLINGS OF REDUCED SIZE AND CAPABLE OF TRANSMITTING HIGH MECHANICAL STRESSES BETWEEN AN ARMOURED FLEXIBLE MEMBER AND A RIGID ELEMENT

This is a division, of application Ser. No. 25,118, filed on Apr. 2, 1970 now U.S. Pat. No. 3,667,112, the disclosure of which is incorporated by reference herein.

The present invention relates to a device for making couplings of reduced size and capable of transmitting high mechanical stresses between a flexible member, such as a cable or pipe, provided with at least one armouring of wires or strands, and a rigid element. It is often necessary to secure to the ends of a flexible member rigid elements, which may consist for example of connecting members whereby the flexible member can be connected with other elements and in particular with another flexible member.

This problem arises for example, but not exclusively, when a connection must be effected between two sections of a flexible drill pipe which must transmit tractive forces up to some hundreds tons and torsional stresses which may be of some hundreds kilograms x metres.

The coupling elements used for this purpose in the prior art must be of considerable length and diameter, in order to withstand such high mechanical torsional and tractive stresses applied to the flexible pipe.

It results therefrom difficulties in handling the flexible member such as a pipe, more particularly when this member has to be reeled on a storing winch or must pass on a return pulley.

The reason therefor is that these prior art coupling devices generally include a connecting member whereto are anchored the armourings of the flexible line at their ends through constriction or shrinking of a sleeve surrounding these ends of the armourings.

It is however impossible to obtain by constriction of a sleeve a sufficiently resistant anchoring of the armourings, such that the coupling can withstand tractive forces and torques of the above-indicated order of magnitude, unless very high constriction forces are applied to the sleeve for effecting the shrinking thereof, which is difficult to achieve, particularly in the case of large diametered connecting elements, and which exhibits vary serious drawbacks, as hereinunder pointed out. This leads either to increasing the length of the connecting member whereon the armourings are anchored, thus increasing the length of the coupling, or alternatively to give the external wall of the connecting member and the internal wall of the shrinking sleeve complementary castellated profiles, in a section by a plane containing the axis of the coupling, whereby the wires or strands of the armourings are at their ends blocked by the gripping effect of the so-constituted anchoring teeth on each other, produced by the shrinking of the sleeve.

The deformations which result therefrom are not compatible with the presence of brittle elements, such as electrical conductors, in the armourings. Moreover the shrinking, which requires the application of radially directed forces over the whole axial length of the shrinked sleeve, suffers itself from the serious drawback of producing the buckling of the armourings between the ends of the sleeve which is subjected to a reduction in its diameter. In any way it results therefrom corrugations of the wires constituting the amourings at the ends of the latter, such corrugations being detrimental to the brittle elements contained in these armourings.

One can consider substituting for the shrinking of the sleeve surrounding the ends of the armourings a hammering operation on this sleeve, but the application of shocks to the coupling elements suffers from the drawback of making brittle the metal constituting the sleeve, this being very detrimental to the mechanical resistance thereof. Moreover upon stopping the hammering operation relaxation phenomena occur within the material constituting the sleeve, thus producing some loosening of this sleeve which surrounds the armourings.

Accordingly, the main object of the present invention is to provide a process for securing a flexible member to a rigid element, whereby it is possible to obviate all the above-indicated drawbacks.

In accordance with the present invention, there is provided a device for making a rigid connecting element, made of a hard material, and having a jagged external wall, integral with one end of a flexible member having at least one armouring formed of metallic wires, this device including at least one anchoring ring surrounding the connecting element and on which lays the armouring, the anchoring ring being made of a material or lower hardness than that of the materials of which the armouring and the connecting element are formed, and a wire-drawn compression ring compressing the assembly of the armouring and the anchoring ring against the connecting element. The coupling is effected by covering said connecting element with an anchoring ring made of a material having a lower hardness than that of the material constituting the armourings and said element, laying the armouring onto said anchoring ring, covering the armouring with a compression ring and drawing the assembly of the connecting element, the armouring and said compression ring through a die, thereby producing through a great reduction in the diameter of said compression ring, a penetration of said armouring into said anchoring ring and into said compression ring and at the same time an inlaying of the material constituting said anchoring ring between the jags of the jagged walls of the connecting element. This drawing through a die, according to a wire-drawing process, makes it possible to obtain an uniform clamping effect on the whole periphery of the compression ring and since this clamping effect is at each instant applied exclusively along the periphery of a cross-section of this ring or sleeve and is displaced progressively from one end of the sleeve to the other, there is no longer any buckling of the armourings in contrast to what occurs when, according to the prior art, a process of shrinking the sleeve is employed.

Moreover it has been experimentally ascertained that the drawing through a die or extrusion of the sleeve or compression ring which covers the armouring not only does not reduce the mechanical strength of this sleeve as does the diameter reduction of the sleeve through shrinking or hammering, but, on the contrary, increases its mechanism strength and consequently that of the coupling.

The drawing through a die of compression rings of different diameters may be achieved by using a die of a greater diameter than the rings, by surrounding the latter with auxiliary rings for adaptation to the diameter of the die. These auxiliary rings may be removed by cutting them out, after the drawing operation has been completed.

According to a preferred embodiment, whereby is obtained a maximum compression effect on the armouring against the coupling member, any relative axial displacement of the connecting member and of the compression ring is prevented during the drawing operation by making the rigid connecting element and the compression ring solid with each other in axial displacement during the drawing of the compression ring.

Figure 2A:
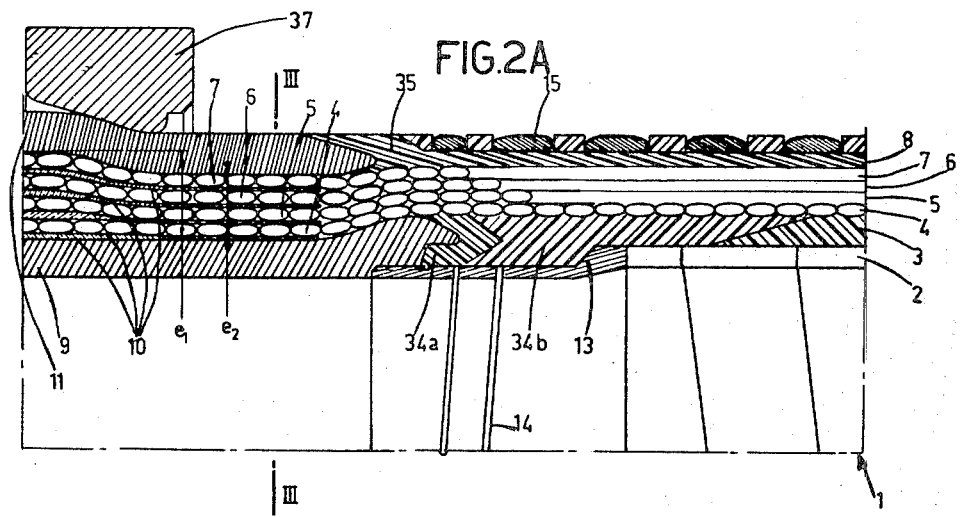
Figure 2B:
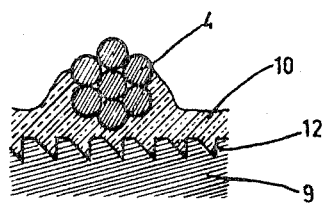
Figure 3:
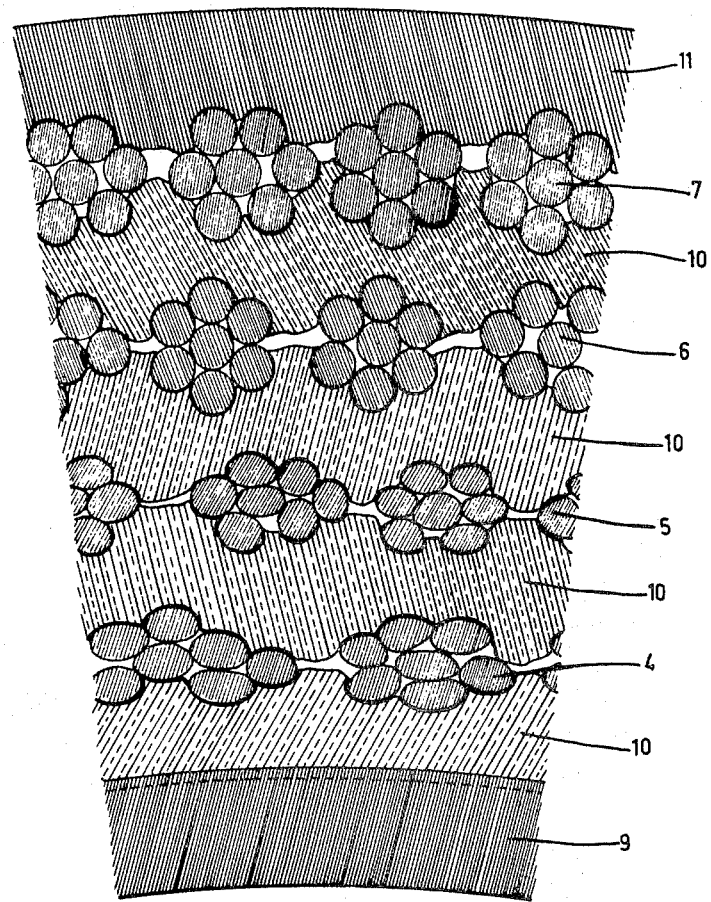
Figure 5:
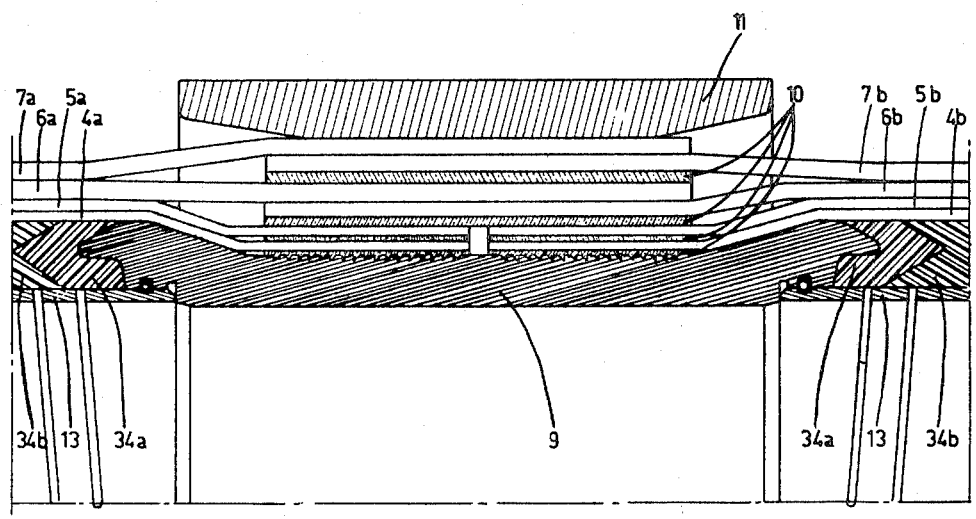
Figure 4:
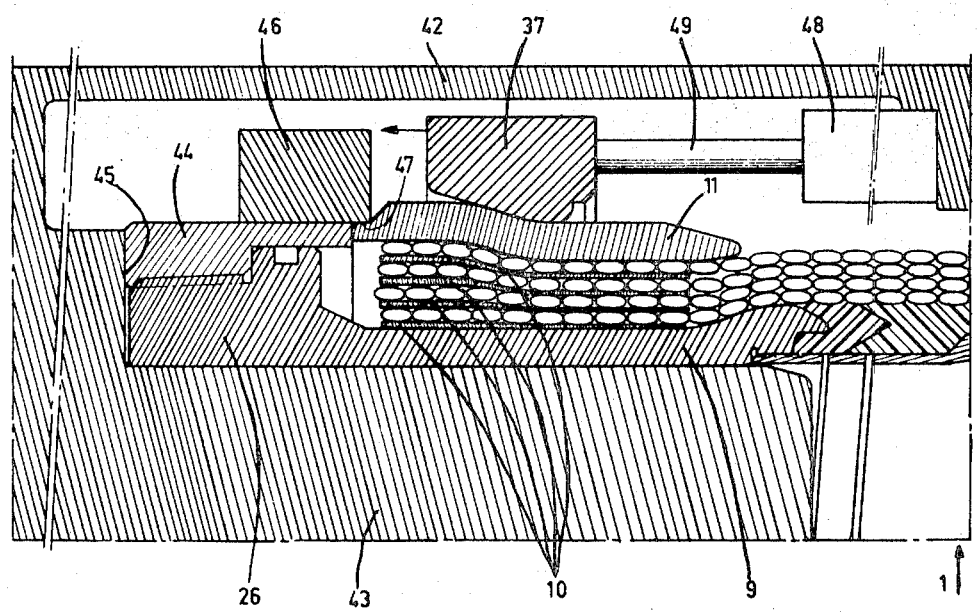
Figures 5A, 5B, 5C:
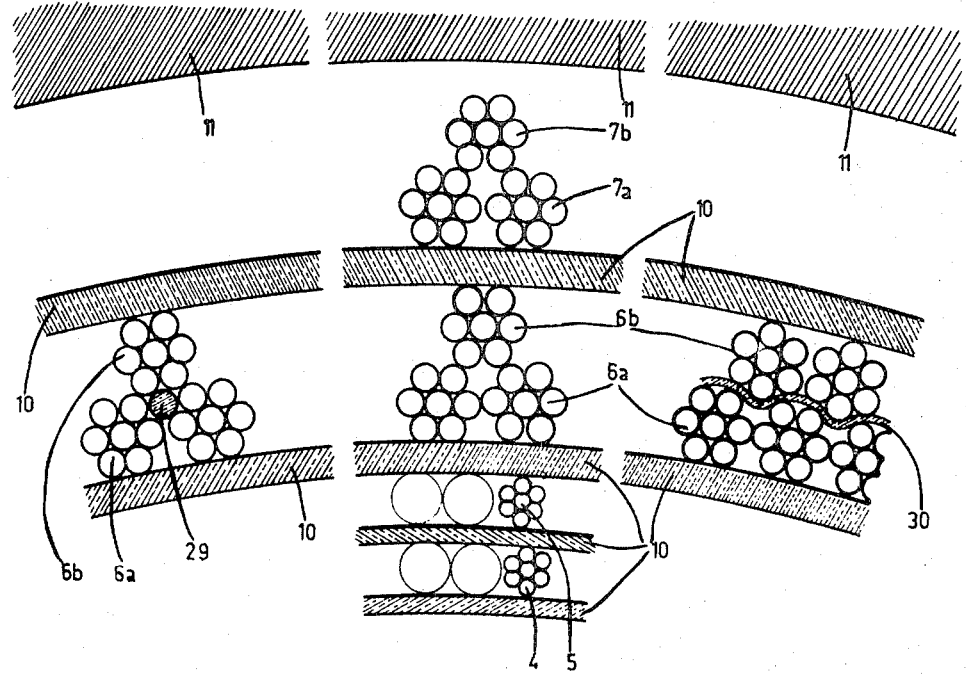
Figure 6:
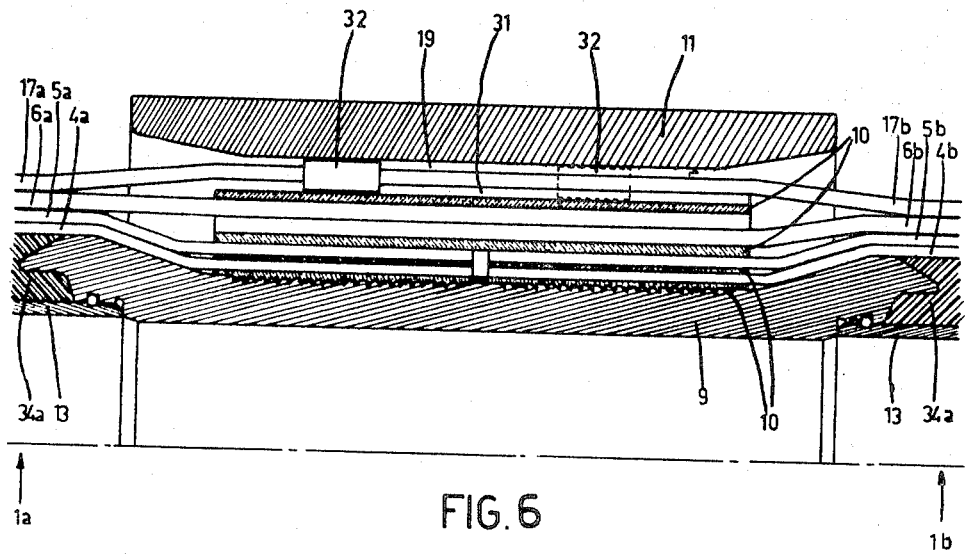
Figure 7:
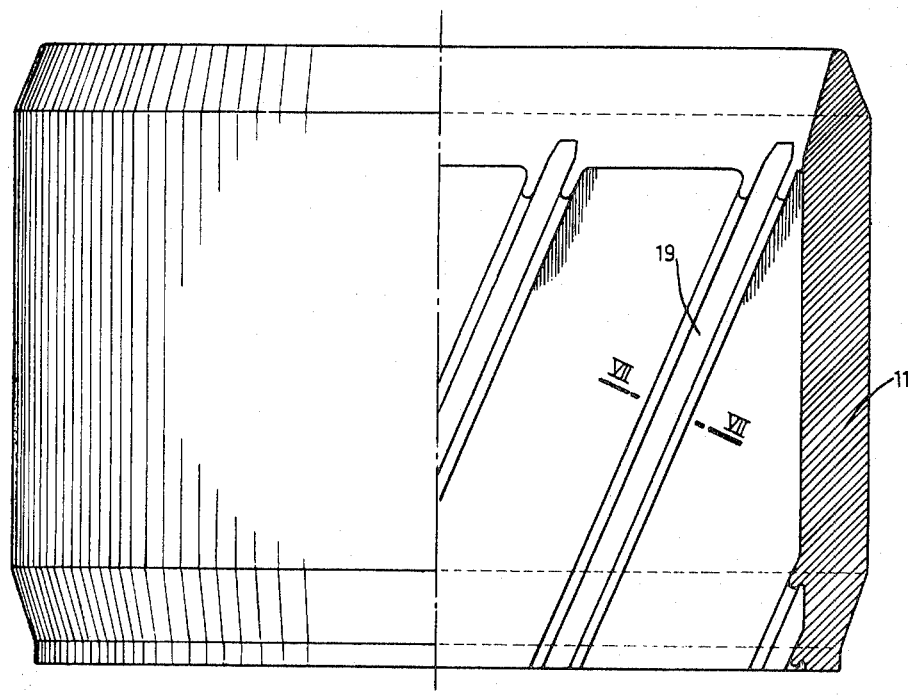
Figure 7A:
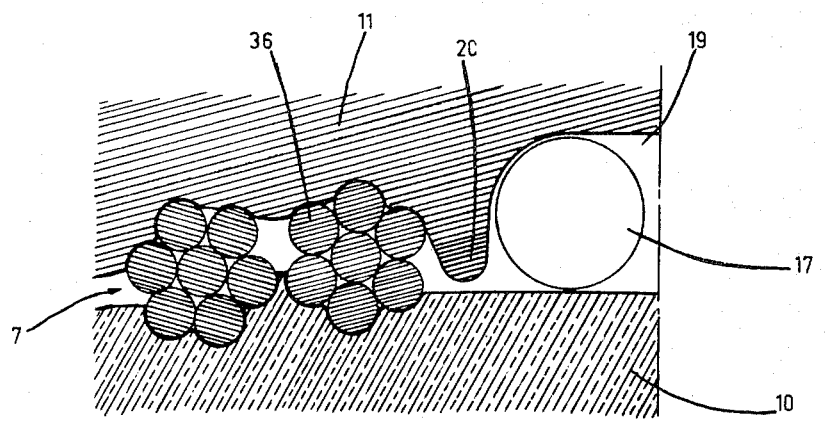
Figure 9:
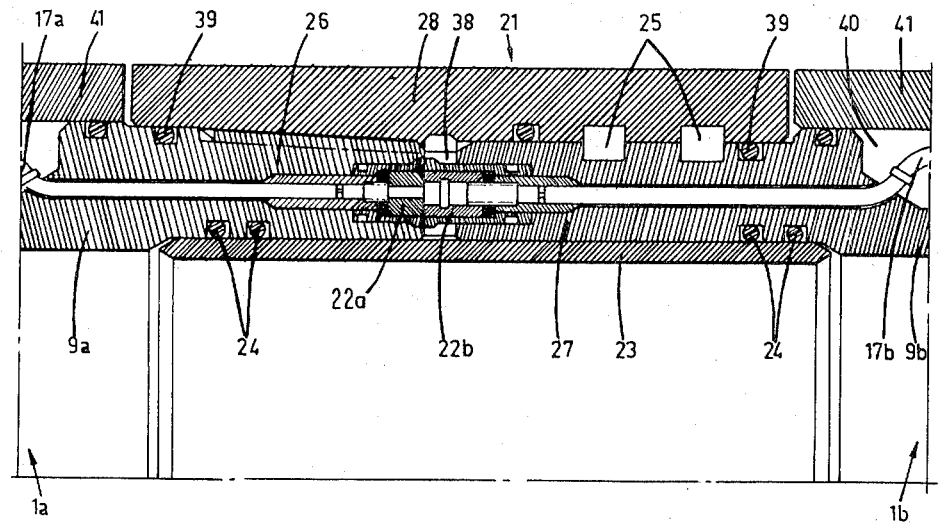
Figure 10:
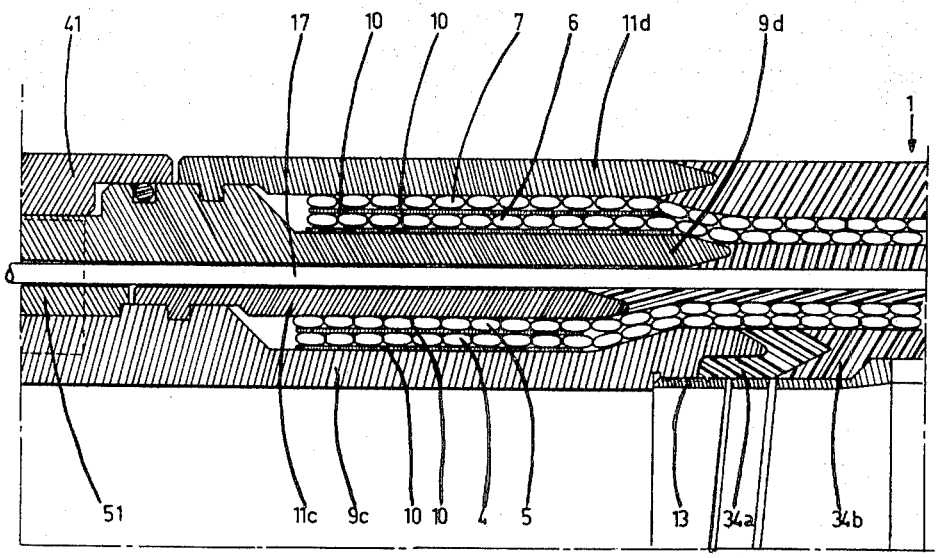

The invention will be more readily understood and further advantages will be apparent when considering the non-limitative embodiments of the invention illustrated by the attached drawings wherein:

FIG. 1 shows the different parts of a device for coupling a flexible pipe to a rigid tubular element, FIG. 2A is an axial cross-sectional view of the same device during the drawing thereof through a die, FIG. 2B is a partial very enlarged view of FIG. 2A after the connection has been completed, FIG. 3 is a partial very enlarged sectional view along line III—III, of FIG. 2A, FIG. 4 illustrates a preferred way for carrying out the drawing operation, FIG. 5 illustrates a connection between two sections of an armoured pipe, FIGS. 5A, 5B and 5C represent on a larger scale, in partial cross-section perpendicular to their axis, different embodiments of the coupling illustrated in FIG. 5, FIG. 6 shows a coupling device similar to that of FIG. 5, in the case where the flexible pipe includes electric conductors or hydraulic hoses-constituting transmission lines, FIG. 6A shows an enlarged partial sectional view of the device illustrated in FIG. 6, FIG. 7 shows a compression ring which can be used in a coupling similar to that of FIG. 2A, for the connection of flexible pipes having electric conductors or hydraulic hoses embedded therein, FIG. 7A is an enlarged partial sectional view of FIG. 7 along line VII—VII, FIGS. 8 and 8A illustrate two modifications of the device shown in FIG. 7, FIG. 9 illustrates an embodiment of a detachable coupling for a flexible pipe having eleectric conductors or hydraulic hoses embedded in one of its armourings, FIG. 10 illustrates an embodiment of a coupling device for a flexible pipe having a layer of power transmitting lines separating the pressure resistant armourings and the armourings for withstanding tractive forces.

In FIGS. 1 and 2A, the reference numeral 1 designates a flexible pipe which includes the following elements:

a. an internal metallic armouring 2 constituted by the helical winding of a metal strip,
b. a core 3 of elastomeric or thermoplastic material,
c. two external armourings constituted by helical windings of metallic wires or strands.

The first external armouring of this pipe, constituted for example by two of the layers of wires or strands 4 and 5, withstand the internal pressure, while the second external armouring, constituted for example by two of the wires or strands 6 and 7, withstand tractive forces and resist to the applied torsional torques. These different layers are wound with suitable pitches in a manner well-known to those skiloed in the art.The reference numberal 8 designates the external coating of elastomeric or plastic material of the flexible pipe.

In the embodiment of FIG. 1 the rigid connecting element to be connected with the flexible pipe 1 is a tubular element indicated by the reference numeral 9. It is made of a very hard material, such as steel having a traction strength of 180 kg/mm².

Its internal diameter is substantially equal to the internal diameter of the flexible pipe 1. Its external diameter is preferably slightly smaller than the external diameter of the core 3 of the flexible pipe 1 (FIG. 2A).

The external wall of the tubular element 9 has a jagged outline 12 (FIG. 2B) which may for instance be obtained through machining the tubular element.

In order to achieve the desired coupling each external armouring is laid onto an anchoring ring 10 of small thickness (as shown by FIG. 1), made of a material such as annealed copper, which is not so hard as the armourings 4, 5 6 and 7 and the tubular element 9.

The armourings are then covered with a compression ring 11, for example made of steel, and the assembly is introduced through a die 37 (FIG. 2A). The operation of drawing the assembly through the die, which, in this embodiment, is carried out at room temperature, produces, through a great reduction in the diameter of the compression ring 11, the penetration of the armourings into their respective anchoring rings 10. It produces at the same time the penetration of the wires or strands of the armouring 7 into the compression ring 11 and an inlaying between the jags of the jagged external wall of the tubular element 9 of material constituting the anchoring ring 10 which covers this element.

The reduction of thickness $e_2-e_1$ (FIG. 2A) of the assembly of layers formed by the armourings and their anchoring rings 10 will be preferably between 20 and 75 percent of the initial thickness of this assembly of layers before its passage through the die 37.

FIG. 3, which is a very enlarged partial sectional view of FIG. 2A along line III—III, shows the metallic strands of the armouring penetrating into the rings 10 and into the compression ring 11, in the case of the armouring 7, while the jags 12 of the tubular element 9 penetrate (FIG. 2B) into the ring 10 covering this tubular element.

By this way the adherence between the elements of the coupling device increases with the force of radial compression exerted by the ring 11 and which results on the one hand in the inlaying of the material constituting the anchoring rings between the strands and between the jags of the tubular element 9 and, on the other hand, in the hardening of this material.

The thus-provided connection makes it possible to transmit without any risk of failure high mechanical loads between the armourings and the tubular element 9 and it is possible to reduce the length and the external diameter of the coupling device This coupling device thus will not substantially change the flexibility of the pipe at this place, thus facilitating the subsequent reeling thereof on a storing winch and the passage of this pipe on a return pulley.

In the coupling of FIG. 2A, the internal and external sealing of the device is completed by a filling of elastomer 34a, 34b, connecting the core 3 to the tubular element 9 and a filling of elastomer 35 connecting the external coating 8 to the ring 11.

Furthermore, in order to ensure the continuity of the internal armouring 2, coupling means 13 provides for a mechanical connection between this armouring 2 and the tubular element 9. This means 13 consists of a ring which is provided with a helical groove 14 giving to this ring some elasticity.

In order to avoid any abrupt change in the flexibility of the assembly in the vicinity of the coupling device, a spring 15 which may be of any known type, provides for a progressive variation in the flexibility of the pipe in the vicinity of this coupling device.

The interval between adjacent convolutions of the spring 15 may be filled with an elastomer made integral with the coating 8 but not adhering to the spring 15.

FIG. 4 illustrates the process of drawing through a die the compression ring 11 whereby the tubular element 9 can be connected to the flexible pipe 1.

In this embodiment the tubular element is extended by a threaded coupling member 26 which is adapted to provide a detachable connection of the pipe 1 with another pipe having one end integral with a coupling element complementary to the element 26.

When the different elements which constitute the connecting device have been positioned as hereinabove indicated (FIG. 1) the tubular element 9 is placed on a support member 42 (FIG. 4) provided with means 43 for centering the tubular element 9. This centering device holds the element 9 along the axis of a die 37 and prevents any risk of deformation of the bore of the tubular element 9 during the operation of drawing through the die. Then a threaded ring 44 made of two parts is placed onto the connecting element 26.

An end face of this ring comes into abutment against a shoulder 45 of the support member 42 while the other end stops the compression ring 11 and maintains this ring in a fixed axial position. A cylindrical ring 46 holds together the two parts of the threaded ring 44 whereon ring 46 is axially slidable. The bore of ring 46 cooperates with a cylindrical surface 47 of ring 11 so as to keep the latter concentrical to the tubular element 9 before the beginning of the drawing operation. The die 37 is then displaced by the piston 49 of the jack 48 in the direction indicated by the arrow.

As shown by FIG. 4, the die 37 reduces very substantially the diameter of ring 11. As a result of the locking of the compression ring 11 against axial displacement with respect to the tubular element 9, no sliding or substantial elongation of ring 11 can occur in the direction of the axis of this ring and the material forming this ring is subjected to a high compression, thus strongly compressing the assembly of the elements of the connecting device against the tubular element 9.

Moreover the use of a die makes it possible to obtain a uniform compression along the periphery of ring 11.

At the end of the drawing operation, die 37 pushes away ring 36 thus liberating the ring 44 made of two parts whose external diameter is smaller than the internal diameter of the die, which makes the disassembling possible.

FIG. 5 illustrates a connecting device which is not detachable.

This device makes it possible, by employing the process according to the invention, to repair a line, such as a flexible pipe, which is locally defective while keeping substantially unaffected the mechanical characteristics of the flexible pipe.

After having removed, for example by cutting out, the defective part of the flexible pipe 1, the connection between the two pipe sections thus obtained is effected by very strongly compressing in a single drawing operation the external armourings 4a, 5a, 6a, 7a and 4b, 5b, 6b, 7b against a tubular element 9 by means of a compression ring 11, using rings 10 of the above defined type. In this particular embodiment, the pressure resisting armourings 4a and 4b, 5a and 5b of the two pipe sections are placed end to end, while the traction resisting armourings 6a and 6b, 7a and 7b overlap each other over the whole length of the coupling.

FIGS. 5A, 5B and 5C show different possible arrangements, at the place of the connection between the corresponding armouring layers of the two pipe sections to sections to be connected, in the case of a connection of the type illustrated by FIG. 5.

In FIG. 5A the strands of the two corresponding layers of the traction-resisting armourings and of the pressure -resisting armourings have a staggered arrangement.

In FIG. 5B, an auxiliary wire 29, made for example of copper, fills up free spaces or gasp between the staggered strands.

In FIG. 5C, a very thin ring 30, made for example of copper is placed between the strand layers.

After drawing through a die the compression ring 11, such a ring 30 will be capable of transmitting high forces between two corresponding traction-resisting armouring layers 6a and 6b or 7a and 7b. The small thickness selected for this ring will make it possible during the assembling to easily locate the respective positions of the strands of the armouring layer covered by this ring (by providing a deformation of this ring between two adjacent strands), thus enabling to position correctly the strands of the overlaying armouring layers.

In the case of pipes embedding transmission lines constituted by electric conductors or hydraulic hoses, for transmitting power or informations, the devices for connecting two pipe sections must provide for the continuity between these conductors or hoses.

FIG. 6 shows a device similar to that of FIG. 5 in the case where the flexible pipes include such lines as hydraulic hoses or electric wires 17a and 17b embedded in the pipe wherein they replace some strands of the pressure-resisting armouring.

After having gathered all the lines 17 in the external layers 7a and 7b of the two pipe sections 1a and 1b respectively by transferring the lines 17a and 17b from the strand layers 6a and 6b to the upper layers 7a and 7b respectively, by exchanging each of these lines with a strand of the layers 7a and 7b at the place of the connecting device, this lines are placed into grooves 19 which have been provided fo this purpose in the internal wall of ring 11 and whose sides are extended by shoulders 20 (FIG. 6A). The connection of the lines 17a and 17b is effected at 32 within the connecting device before the drawing thereof through the die.

Auxiliary wires 31, for example of elastomer (FIG. 6A) fix the position of the electric or hydraulic lines within the grooves 19 thus preventing their deterioration during the drawing of the external ring through the die.

FIGS. 7 and 7A illustrate a way of making a connection similar to that illustrared in FIG. 2A, in the case where the flexible pipe includes conductors 17 embedded in the strand layers 6 and 7.

As shown in FIG. 7, the compression ring 11 is provided with grooves on its internal surface. These grooves are deep enough to receive the lines 17 preventing the same of being deteriorated by the drawing operation.

The side walls of these grooves are extended by shoulders 20 (FIG. 7A) on the side of the adjacent strands such as strand 36.

As shown in FIG. 7A, during the drawing operation of the clamping ring 11 upon the strand layer 7 which lays on a ring 10 of the above-indicated type, the strands 36 close to the lines 17 bear against the shoulders 20 of ring 11 and thus cannot compress the lines 17 by sliding.

FIGS. 8 and 8A show another embodiment of a device for protecting the conductors 17 during the drawing operation.

Preformed metallic sleeves 33 surround the strands located between two consecutive passages of the lines 17.

The lower wall 50 of these sleeves replaces, for the armouring comprising the lines 17, the ring 10 of the above-described device.

FIG. 9 is a longitudinal sectional view showing an embodiment of a detachable device 21 for connecting two sections of flexible pipes including electric conductors or hydraulic hoses 17a and 17b.

A first tubular element 9a, made integral wirh the end of a first pipe section 1 a, using the process according to the present invention is extended by a tubular element 26, threaded on its external wall, which is provided with ribs 38 on its end wall perpendicular to its axis and which includes connecting members 22a to which are connected the lines 17a.

In a similar way, a second tubular element 9b, integral with the end of a second pipe section 1 b, is extended through a tubular element 27 also provided with ribs on its end wall. This tubular element 27 includes connecting members 22b to which are connected the lines 17 b. On this element 27 is mounted a threaded ring 28 axially blocked through at least one roller bearing, whose rollers permit rotation of the ring 28 about element 27. The mounting is achieved by bringing the elements 26 and 27 close to each other through screwing the ring 28 on the threading of the element 26 until the teeth 38 are inserted between the corresponding teeth of the element 27.

The transmission of the tractive forces is provided for by the threading of the element 26, the teeth 38 providing for the transmission of the torques and the connectors 22 a and 22 b providing for the connection between lines 17 a and 17b.

A socket 23, surrounded by annular sealing joints 24 provides for the internal sealing of the connecting device at the place of connection. Other annular joints 38, surrounding the element 26 and 27 provide for the external sealing.

An annular space 40 between a zone of reduced external diameter of element 27 and a protecting ring 41 permits connection of any of lines 17 b to any of connectors 22 b.

FIG. 10 illustrates an embodiment of a connecting device for a flexible member, such as a pipe used in the drilling process wherein the drill bit is directly coupled to a bottom motor suspended from the flexible pipe.

This pipe includes a layer of power transmitting lines between the pressure-resisting armourings and the traction-resisting armourings.

The pressure-resisting layers 4 and 5 are made integral with the tubular element 9 c in the manner indicated in FIG. 2A, by drawing a compression ring 11 c.

The external diameter of this ring being smaller than that of the flexible pipe, an adaptating ring will be placed around ring 11, making it possible to use a die of a larger diameter than that of the flexible pipe 1. This adapting ring is removed for example by cutting it out, affet the drawing operation of ring 11 c has been performed.

The power transmitting conductors 17 are then laid all around ring 11 c. A second rigid tubular elemenent 9d is then placed upon the layers of conductors 17. This element 9d is centered on the rigid element 9c by means of ribs 51 bearing on element 9c. The traction-resisting armourings 6 and 7 are then connected to the rigid element 9d by drawing through a die a compression ring 11 d, in the above-indicated way, using intermediate anchoring rings 10.

What we claim is:

1. A coupling device including rigid connecting element made of a hard material and having a jagged external wall and being made integral with one end flexible member having at least one armouring formed of metallic wires, at least one wire of said armouring of metallic wires being substituted by at least one transmission line means for transmitting electric current or fluid under pressure, this device including at least one anchoring ring surrounding said connecting element and on which lays said armouring, said anchoring ring being made of a material of lower hardness than that of the materials of which said armouring and said connecting element are formed, and a wire-drawn compression ring compressing the assembly of said armouring and said anchoring ring against said connecting element, said compression ring being provided with at least one groove receiving said transmisstion line means, said groove having side walls radially extended by shoulders which constitute abutments for the wires adjacent to said transmisssion line means.

2. A coupling device including a rigid connecting element integral with one end of a flexible member having at least first and second armourings made of metallic wires, these armourings being separated by at least one layer of transmission line means for transmitting electric or hydraulic power, this device including a first connecting memeber and a second tubular connecting member constituting said rigid connecting element, each of said first and second members being made of a hard material and having a jagged external wall, a first anchoring ring surrounding said first connecting member and on which lays said first armouring, a first compression ring compressing said first armouring against said first connecting member, said second tubular connecting member being externally concentrically disposed with respect to said first connecting member and having an internal diameter sufficient to provide passage to the layer of transmission line means between said first compression ring and said second tubular member, means positioning said first and second connecting members with respect to each other, a second anchoring ring surrounding said second tubular connecting member and on which lays said second armouring, and a second compression ring compressing said second armouring against said second connecting member, said first and second anchoring rings being made of material of lower hardness than that of the materials of which said first and second armourings and said first and second connecting members are formed.

* * * * *